(12) United States Patent
Reem et al.

(10) Patent No.: US 8,442,805 B2
(45) Date of Patent: May 14, 2013

(54) EFFICIENT COMPUTATION OF VORONOI DIAGRAMS OF GENERAL GENERATORS IN GENERAL SPACES AND USES THEREOF

(75) Inventors: Daniel Reem, Haifa (IL); Simeon Reich, Haifa (IL)

(73) Assignees: Daniel Reem, Kfar-Vradim (IL); Simeon Reich, Haifa (IL)

( * ) Notice: Subject to any disclaimer, the term of this patent is extended or adjusted under 35 U.S.C. 154(b) by 794 days.

(21) Appl. No.: 12/461,216

(22) Filed: Aug. 5, 2009

(65) Prior Publication Data

US 2010/0036647 A1 Feb. 11, 2010

Related U.S. Application Data

(60) Provisional application No. 61/086,221, filed on Aug. 5, 2008.

(51) Int. Cl.
*G06F 7/60* (2006.01)
*G06F 17/10* (2006.01)

(52) U.S. Cl.
USPC .......................................................... 703/2

(58) Field of Classification Search .................. 703/2
See application file for complete search history.

(56) References Cited

U.S. PATENT DOCUMENTS

| 6,356,263 B2 * | 3/2002 | Migdal et al. ............ 345/423 |
| 2004/0075656 A1 * | 4/2004 | Kimia et al. ............ 345/420 |
| 2010/0036647 A1 | 2/2010 | Reem et al. |

OTHER PUBLICATIONS

Nirav Patel, "Voronoi Diagrams Robust and Efficient implementation" May 5, 2005, Binghamton University Department of Computer Science, 71 pages.*

* cited by examiner

*Primary Examiner* — Dwin M Craig

(57) ABSTRACT

The Voronoi diagram is a decomposed region X made into cells, the decomposition being induced by a set of generators $(P_k)_{k-K}$, and a distance function, and involves finding for each generator $P_k$ a cell, which is a set of all the points in X satisfying the condition that the distance to the current generator $P=P_k$ is not greater than the distance thereof to the union A of the other generators. For each generator, and for each point p in this generator, the method selects a set of directions, then for each direction recursively tests a ray in that direction, until a certain interval on the ray is shorter than or equal to a given error parameter. A point corresponding to the interval on the ray is then selected as an end point, and cells are defined from the end points, thus forming the Voronoi diagram.

9 Claims, 9 Drawing Sheets
(3 of 9 Drawing Sheet(s) Filed in Color)

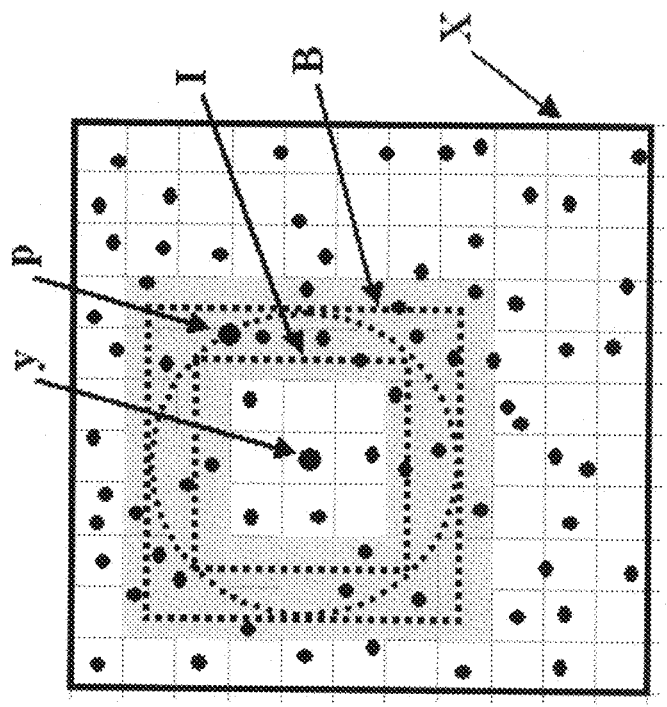
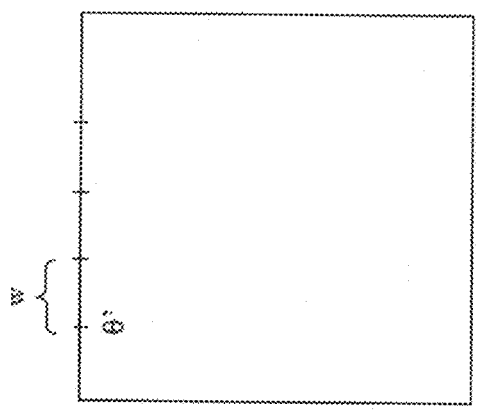
Fig. 7B
Fig. 7A

EFFICIENT COMPUTATION OF VORONOI DIAGRAMS OF GENERAL GENERATORS IN GENERAL SPACES AND USES THEREOF

RELATIONSHIP TO EXISTING APPLICATIONS

The present application claims the benefit of priority of U.S. Provisional Patent Application No. 61/086,221, filed on Aug. 5, 2008, the contents of which are incorporated herein by reference.

FIELD AND BACKGROUND OF THE INVENTION

The present invention relates to a device and method for efficient computation of Voronoi Diagrams of General Generators in General Spaces and to uses thereof in technology and, more particularly, but not exclusively to uses thereof in communications networks, in robotics, in three-dimensional networks, in materials science, in molecular biology, in searching of data, in a way of providing overall control of a variety of methods for applications such as image processing, data categorization, numerical simulations, meshing, solid modeling, clustering etc, efficient designs of electronic circuits, for management of graphical information systems, efficient location problems, face recognition and image recognition in general, as an artistic tool, and as a programming tool, Voronoi diagrams (Dirichlet's tessellations) are one of the basic structures in computational geometry. Roughly speaking, they are a certain decomposition of a given space X into cells, induced by a tuple of subsets $(P_k)_{k \in K}$, called the generators or the sites, and by a distance function. More precisely, the k-th Voronoi cell is the set of all the points in X whose distance to $P_k$ is not greater than their distance to the union of the other generators $P_j$. They are named after Georgy Voronoi, and may also be referred to as a Voronoi tessellation, a Voronoi decomposition, or a Dirichlet tessellation (after Lejeune Dirichlet), Voronoi diagrams appear in a huge number of places in science and technology and have many applications. One can find them and their applications in chemistry, biology, archeology, image processing, computational geometry, crystallography, geography, metallography, economics, art, computer science, astronomy, linguistics, robotics, communication and many more places.

In the simplest case, we are given a set of points S in the plane, which are the Voronoi sites. Each site s has a Voronoi cell, also called a Dirichlet cell, V(s) consisting of all points in the plane whose distance to s is not greater than their distance to any other site. Bisectors of the Voronoi diagram are all the points in the plane that are equidistant to two sites. The Voronoi vetices are the points equidistant to three or more sites. FIG. 1 illustrates a Voronoi diagram of a random set of points in a plane, showing points, sites, bisectors and vertices.

A very simple real world illustration of Voronoi diagrams is demonstrated by the following example. Let $P\_1, \ldots, P\_n$ represent n shops in some city/district, where each P_k represents a single shop. The k-th Voronoi cell is the collection of all the points in the city for which the k-th shop is the closest one. Hence, if the potential costumers choose their preferred shop based on the geographical distance, the k-th Voronoi cell can be used to estimate roughly the size of the set of the potential costumers of the k-th shop. If costumers measure their preferences by some other distance functions, say the $l\_1$ (Manhattan) distance, by a distance which takes into account the topography, or by some mixed distance which takes into account also price considerations, then the Voronoi diagram may be changed drastically. As a further realistic generalization, we may think of P_k as representing a firm of shops, and hence allow it to include several shops. We may also allow the case where P_k and P_j have a nonempty intersection, and this represents the case where two competitor shops are located in the same place (e.g., in a shopping center).

Having all of the above in mind, it can be seen that developing methods for computing Voronoi diagrams is therefore an important task. Many such methods have been published and implemented in the last decades. Among them we mention the naive method, the divide-and-conquer method, the incremental method the plane sweep method, methods which make use of lower envelope, and methods based on geometric transforms. However, these methods are for specific cases. They impose restrictions on either the space X, the generators $(P_k)_K$, the distance function d, and sometimes even impose a priory assumptions on the behavior of the Voronoi cells themselves. The most studied case is the Euclidean plane, with a finite set of generators, each one represents a distinct point. A typical method which generalizes this case usually assumes that two or three of the four components of the quartet (X, d, $(P_k)_K$, K) are simple, and then tries to generalize the other one(s). For example, it assumes that the quartet is the Euclidean plane with a finite set of distinct line segments/balls, the m-dimensional Euclidean space with a finite set of distinct points, or the plane with the $l_1$ distance and a finite set of distinct line segments.

As far as we know, all known methods assume that K is finite and that the generators are connected. In addition, with the exception of a few studies, (e.g., n possibly intersecting discs in $R^2$), it is assumed that the generators are disjoint. Moreover, the generators are simple in some sense. For example, they are assumed to be special curves, e.g., line segments or circular arcs, special surfaces, e.g., spheres, or some other special shapes such as polygons or balls.

One of the characteristics of the known methods is that they suffer from degenerate cases, from stability problems due to numerical errors, and that their success is not always fully proved. This is especially true when the generators are not assumed to be distinct points, or (X, d) is not assumed to be the Euclidean plane. Another characteristic is that their implementation is quite complicated, for example because one has to take into account all the degenerate cases. A third characteristic is that with the exception of few cases, such as the naive method with restricted assumptions, one cannot compute the k-th Voronoi cell independently of the other cells, a property which imposes difficulties on attempts to make parallel computations of Voronoi diagrams or to update the diagram when only some of the generators are changed. (However, such attempts do exist.) A fourth characteristic is that most of the methods compute the exact Voronoi diagram, by computing the exact boundary of the corresponding cells. This is done either directly, or by computing a dual concept (Delaunay triangulation). The resulting Voronoi diagram is however also approximated, either because of numerical errors, or because some approximations are made during their implementation.

We note that there are some methods which try to approximate the Voronoi diagram. We mention two. The first is the digital plane method which is a brute force method; it is for grids. It does not impose any restriction on the distance function or on the generators, which are assumed to consists of finitely many points, but however it is slow and in practice it is used for grids in $R^2$, and sometimes in $R^3$. The second method is based on octrees and is for generators of a general form in Euclidean spaces. We have not been able to determine some of its properties, such as its efficiency or the simplicity of its implementation in practice.

SUMMARY OF THE INVENTION

According to one aspect of the present invention there is provided a computerized method of decomposing a given region X into cells, the decomposition being induced by a set of generators $(P_k)_{k-K}$, and a distance function by finding for each generator $P_k$ a cell, the cell comprising a set of all the points in X satisfying a distance inequality condition based on the distance function that the distance to a current generator $P=P_k$ is not greater than the distance thereof to the union A of the other generators, the method being carried out on an electronic processor and comprising:

for each generator, and for each point p in this generator, selecting a plurality of directions and for each direction recursively testing a ray in the direction, for intervals along the ray until a predetermined stopping condition is reached, selecting a point corresponding to the interval as an end point, and storing the end point in a machine readable format;

defining at least one cell from the end points, thereby decomposing the region X; and outputting the decomposed region X comprising the at least one cell in machine readable format.

In an embodiment, the recursively applying comprises bisecting the ray into two intervals to provide a middle point y, and then testing the distance inequality condition at y, and according to the result, selecting either the interval prior to the point y or beyond the point y for further bisection and testing, until the length of the corresponding interval is less than or equal to further predetermined error parameter.

In an embodiment, the distance inequality condition is tested by:

computing d(y,A) and comparing it to d(y,p), or comparing d(y,p) to d(y,a) for all a in A until d(y,a)<d(y,p) is satisfied for the first time, or is not satisfied at all.

In an embodiment, testing the distance inequality condition comprises:

a preprocessing stage in which the points of the generators are located in small boxes of X, selecting a ray and a point y thereon, constructing a box B around the point y, testing the inequality d(y,A)<d(y,p) by taking points a of A inside the small boxes in successive shells around y within or bisecting boundaries of B, and testing the inequality d(y,a)<d(y,p) for at least some of these points.

An embodiment may comprise, for at least one generator, denoting end points in $N=2^{(m-1)}$ directions, where m is the dimension of the space, denoting an (m−1)-dimensional box F corresponding to the N the directions, denoting an end point in another, intermediate direction, testing whether all N+1 denoted end points lie on a same hyperplane, up to a predetermined error parameter, if all N+1 end points lie on the same hyperplane, up to the predetermined error parameter, then regarding all end points corresponding to directions between the N directions as lying on the same hyperplane, otherwise dividing F into two parts, and for each part recursively repeating the denoting directions and end points, and testing the hyperplane condition until end points are denoted for all directions.

An embodiment may comprise saving and reusing end point calculations.

In an embodiment, the defining at least one cell from the end points comprises defining a plurality of cells.

The method may comprise applying the decomposed region to one member of the group comprising: controlling a communications network, managing a communication network, controlling a robot, managing a robot, modeling, testing or simulating a three-dimensional network, controlling a three-dimensional network, testing or modeling a material, data searching, searching for data on a network or database, image processing, mesh generation and re-meshing, curve and surface generation, curve and surface reconstruction, solid modeling, collision detection, controlling motion of vehicles, navigation, accident prevention, data clustering and data processing, proximity operations, nearest neighbor search, numerical simulations, weather prediction, analyzing or modeling proteins, analyzing or modeling biological structures, designing drugs, finding shortest paths, pattern recognition, rendering, data compression, providing overall control of a plurality of methods for image processing, providing overall control of a plurality of methods for data categorization, providing overall control for a plurality of methods for data clustering, designing and testing of electronic circuits, management of geographic information systems, locating a resource according to the solution of an efficient location problem, face recognition, and an artistic tool.

The method may comprise using the decomposed region to construct a Delauney tessellation.

According to a second aspect of the present invention there is provided a computerized method of decomposing a given region X into cells, the decomposition being induced by a set of generators $(P_k)_{k-K}$, and a distance function by finding for each generator $P_k$ a cell, the cell comprising a set of all the points in X satisfying a distance inequality condition based on the distance function that the distance to a current generator $P=P_k$ is not greater than the distance thereof to the union A of the other generators, the method being carried out on an electronic processor and comprising:

for each generator, and for each point p in this generator, selecting a plurality of directions and for each direction recursively testing a ray in the direction, for intervals along the ray until a predetermined stopping condition is reached, selecting a point corresponding to the interval as an end point, and storing the end point in a machine readable format;

outputting the at least one end point in machine readable format.

The output may be a partial cell defined by at least two of the end points.

Unless otherwise defined, all technical and scientific terms used herein have the same meaning as commonly understood by one of ordinary skill in the art to which this invention belongs. The materials, methods, and examples provided herein are illustrative only and not intended to be limiting.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Implementation of the method and/or system of embodiments of the invention can involve performing or completing selected tasks manually, automatically, or a combination thereof. This refers in particular to tasks involving the control of the spectral equipment.

Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1 is a simplified diagram illustrating a standard two-dimensional Voronoi diagram;

FIG. 2 is a simplified flow chart showing a generalized computerized method for calculation of a Voronoi diagram from rays in different directions about a point, according to a first embodiment of the present invention;

FIG. 3 shows a diagram in which rays are drawn about generators to calculate a Voronoi diagram according to the method of FIG. 2;

FIG. 4 is a simplified diagram showing bisection of an interval in a ray, according to an embodiment of the present invention;

FIG. 5 is a simplified diagram showing a Voronoi diagram generated from the generators of FIG. 4, where three of the cells have two generator points and the remaining generators have a single generator point each, according to another embodiment of the present invention.

FIG. 6 is a simplified flow chart illustrating a method of calculating an end point on a ray by successive bisection of the ray, according to an embodiment of the present invention;

Figure 8:
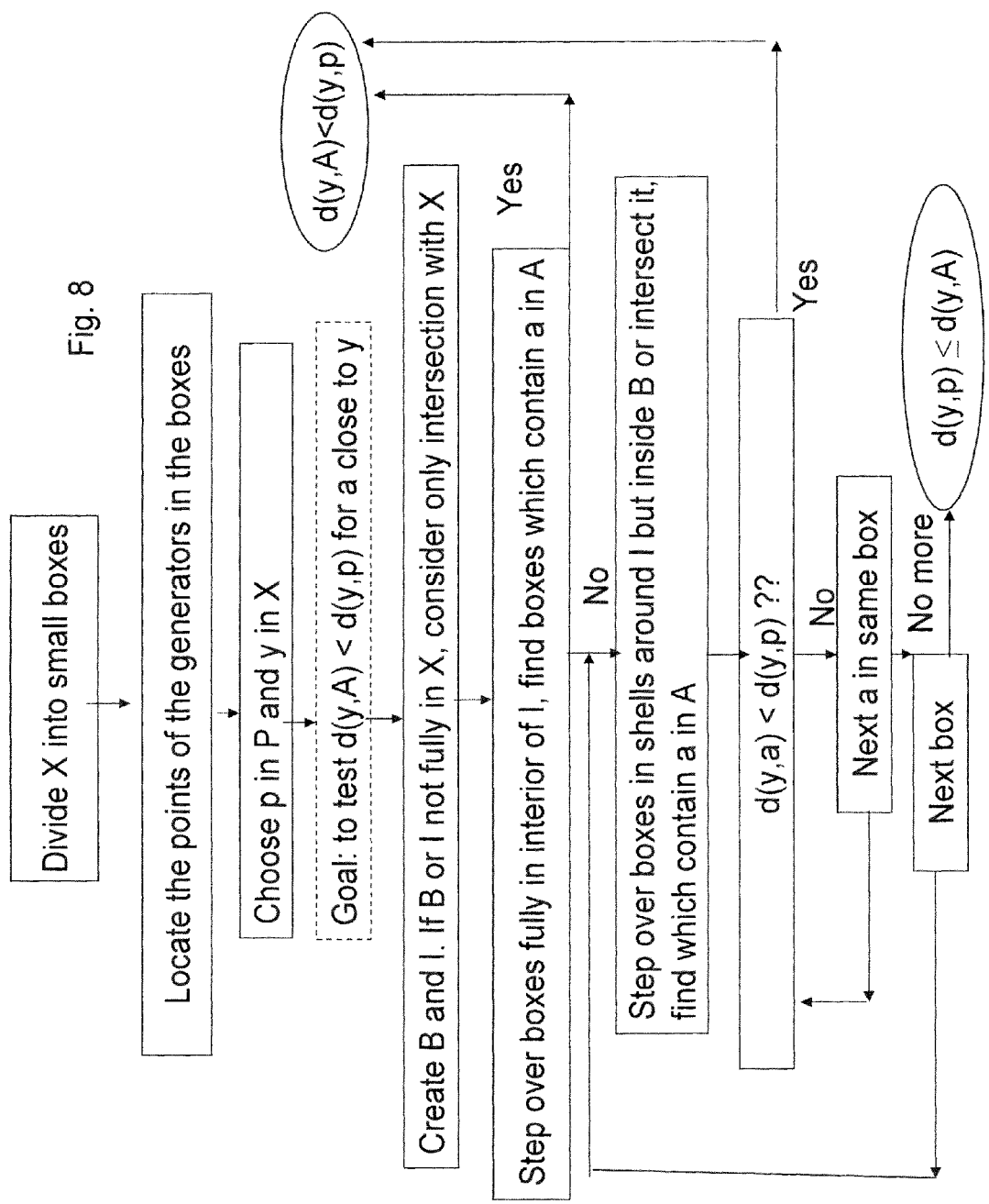

FIG. 7*a* is a simplified diagram showing the setting up of a grid according to an embodiment of the present invention;

FIG. 7*b* is a simplified diagram showing the calculation of the distance inequality by testing within successive shells of boxes, according to a preferred embodiment of the present invention;

FIG. 8 is a simplified flow diagram illustrating a procedure for calculating of the distance inequality according to the successive shells method of FIG. 7*b* according to an embodiment of the present invention.

Figure 9:
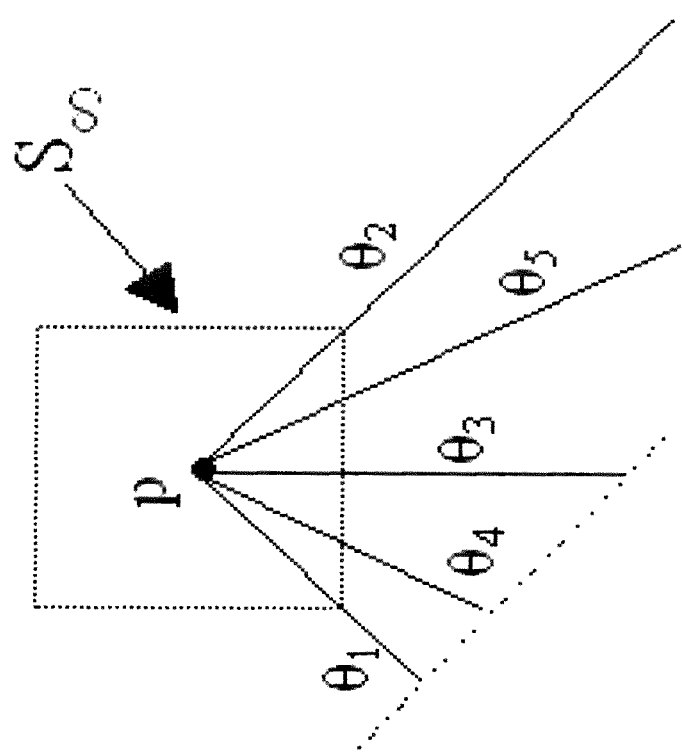
Figure 10:
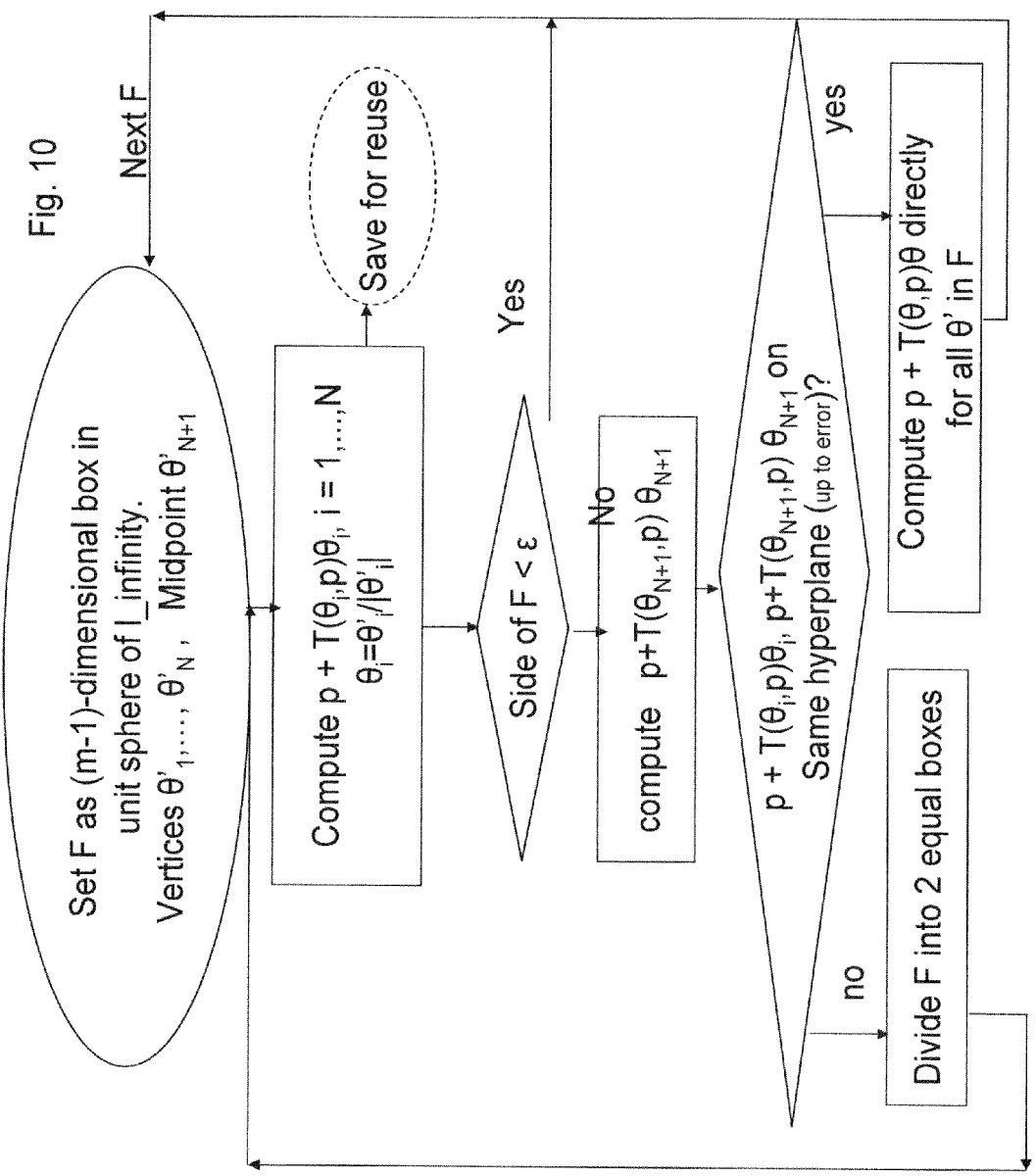

FIG. 9 is a simplified diagram showing in two dimensions a method for reducing the number of endpoint calculations by finding hyperplanes; and FIG. 10 is a simplified flow chart illustrating a procedure for finding the hyperplanes according to FIG. 9.

DESCRIPTION OF THE PREFERRED EMBODIMENTS

In the following description and claims $d(y,z)$ denotes the distance from a point y to a point z and $d(y,A)$ denotes the distance from y to the set A, i.e., the minimum $d(y, a)$ among all a in A. The world or universal set may comprise a bounded and convex region X, say a large box.

If X is not convex, then one simply takes a larger box Y containing X, applies the method for Y, and removes from the result all the parts which are not contained in X. It is noted that the setting here is the normed space, but the method is more general, and holds in a more general setting, including such as hyperplanes and manifolds.

The present embodiments comprise an efficient way of computing the Voronoi diagram by reducing the number of calculations needed for doing the comparison $d(y,p)$ to $d(y,A)$, and or for reducing the number of calculations involving the directions. The second embodiment (of reducting the number of calculations involving the directions) assumes a Euclidean distance function and assumes the distance between P and A is positive. The present embodiments comprise a computerized method of decomposing a given region X into cells. The decomposition may be induced by a set of generators $(P_k)_{k-K}$, and a distance function by finding for each generator $P_k$ a cell, the cell comprising a set of all the points in X satisfying the condition that the distance to the current generator $P=P_k$ is not greater than the distance thereof to the union A of the other generators. The method is carried out on an electronic processor and comprises:

for each generator, and for each point p in this generator, selecting a plurality of directions and for each direction recursively testing a ray in this direction, until a certain interval on this ray is of length less than or equal to some given error parameter.

A corresponding point in this interval, referred to hereinbelow as an end point, is stored in a machine readable format.

The recursion above comprises bisecting the ray into two intervals, taking the a middle point y, then testing a distance function inequality with y, and according to the result, one of these two parts is chosen. The process continues with the chosen interval, which is the interval prior to y if $d(y,A)<d(y,p)$, and the other interval, namely the interval beyond y otherwise.

The distance function inequality is tested for each direction by either:

i. computing $d(y,A)$ and comparing it to $d(y,p)$, or comparing $d(y,p)$ to $d(y,a)$ for all a in A until $d(y,a)<d(y,p)$ is satisfied for the first time, or is not satisfied at all.

or ii. Using the following technique for efficiently testing the inequality $d(y,A)<d(y,p)$. The first stage of this technique comprises a pre-processing stage in which the points of the generators are located in certain parts, hereinafter small boxes of X. The preprocessing stage is carried out prior to testing the rays as described in previous paragraphs. Once a ray and a point y thereon are chosen, a certain box B is constructed around y. The inequality d(y,A)<d(y,p) is tested by finding points a of A inside small boxes contained in B or that intersect B, and testing the inequality d(y,a)<d(y,p) for some or all of these points.

In certain cases, such as when the distance function is Euclidean and the distance between P and A is positive, one can use the following technique for reducing the number of calculations involving the directions:

A point in some generator P is chosen, and $N=2^{(m-1)}$ end points corresponding to N directions (m is the dimension of the space), are computed. One constructs a certain (m−1)-dimensional box F corresponding to the N directions, and computes the end point in another, intermediate direction. Then one tests whether all the above N+1 end points lie on a same hyperplane, up to some error parameter. If all N+1 end points lie on the same hyperplane, up to some error parameter, then all the end points corresponding to directions between the N directions also lie on this hyperplane, so they can be computed directly. Otherwise, one divides F into two parts, and for each part recursively repeats the above procedure of denoting directions and end points, testing the hyperplane condition and so on, until end points are denoted for all directions.

Along the way several calculations can be saved, because they have been already done.

It is noted that the main method can produce only certain cells or only certain end points in certain directions, and hence it supports parallel computing of the whole diagram.

A stage may also be provided in which we create the list of directions. It is possible to create a single list which is good for all points, and this is the way which is effective for the majority of applications. Alternatively it is possible to create a list specific for each point. This alternative would be less usual but perhaps effective for certain applications.

The embodiments presented here have several advantages when compared to existing methods for computing Voronoi diagrams.

For example the present embodiments may be efficient with a reduction in calculation time and storage complexity. The embodiments support multidimensional capability. The embodiments are applicable to any distance function which is a norm, the embodiments are applicable to settings such as manifolds and hyperplanes, and are applicable for any generator shape. The embodiments allow independent computation of cells or cell parts and hence allow localization and parallelization. A successful result using the present embodiments has a mathematical proof, and the method is simple to understand and implement. Computation precision may be arbitrarily defined and achieved.

The principles and operation of an apparatus and method according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Figure 1:
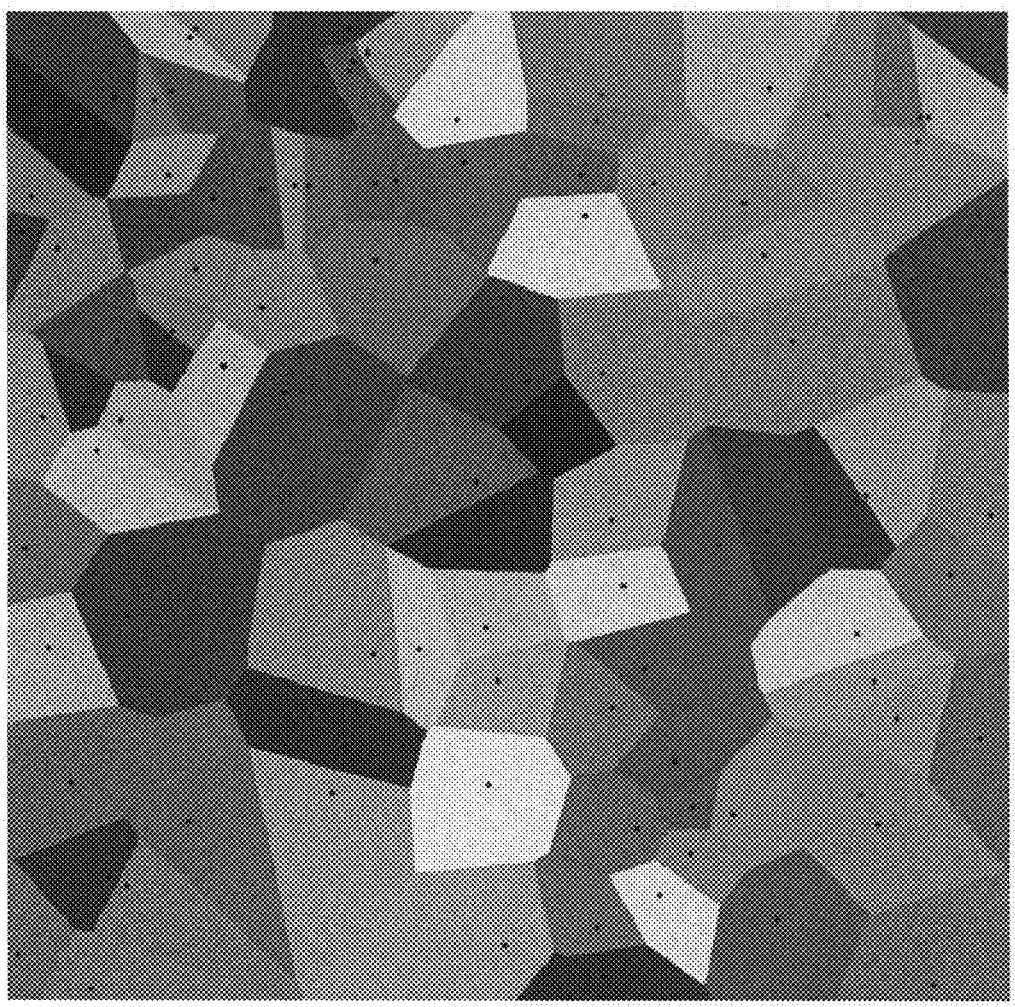

Reference is now made to FIG. 1 which illustrates a two dimensional Voronoi diagram. A series of points serve as generators and are surrounded by cells. The cells close in all the points which are closer to the local generator than any other generator.

Figure 2:
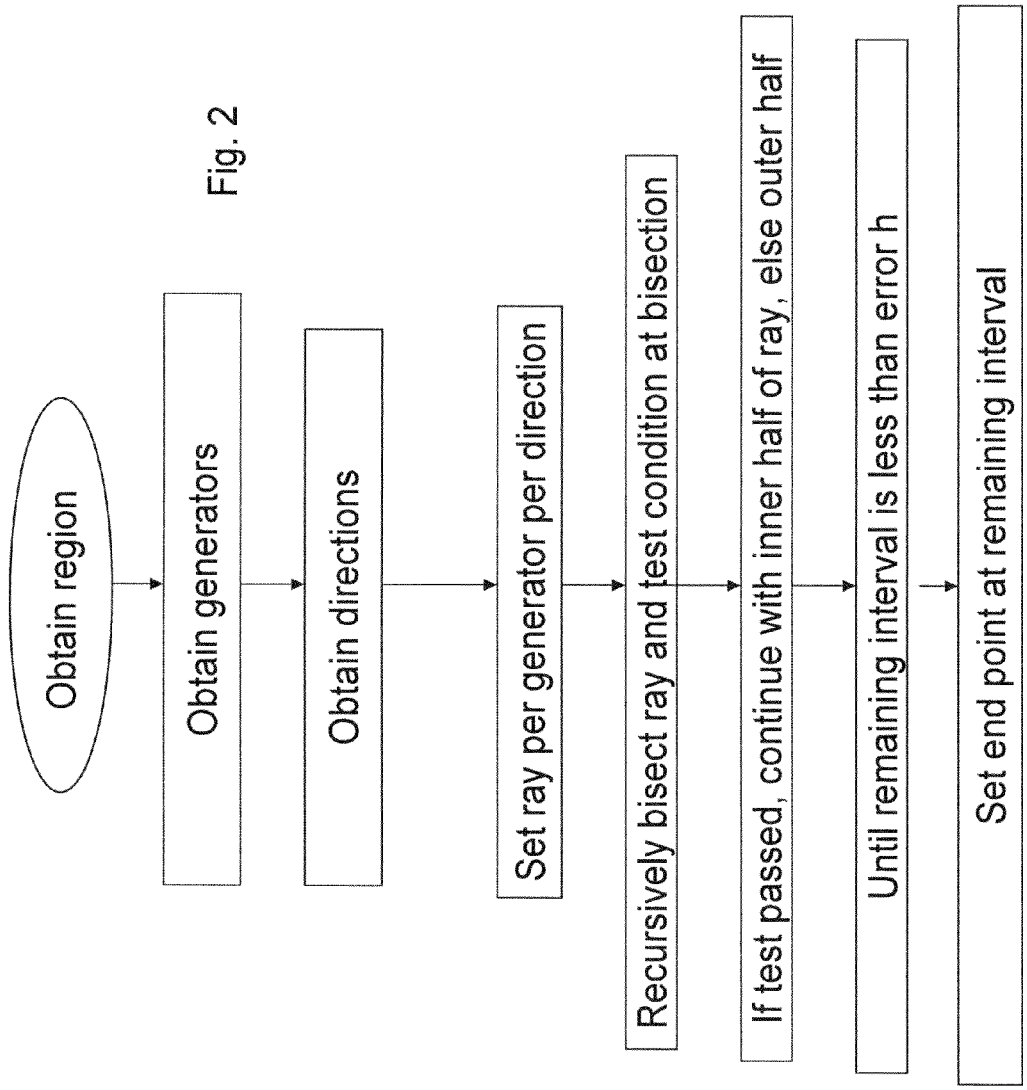

Reference is now made to FIG. 2, which is a simplified flow chart illustrating a computerized method of decomposing a given region X into cells, the decomposition being induced by a set of generators $(P_k)_{k-K}$, and a distance function by finding for each generator $P_k$ a cell, the cell comprising a set of all the points in X satisfying the condition that the distance to the current generator $P=P_k$ is not greater than the distance thereof to the union A of the other generators. The method may be carried out on an electronic processor and is applicable to two, three and higher dimensional regions.

Figure 3:
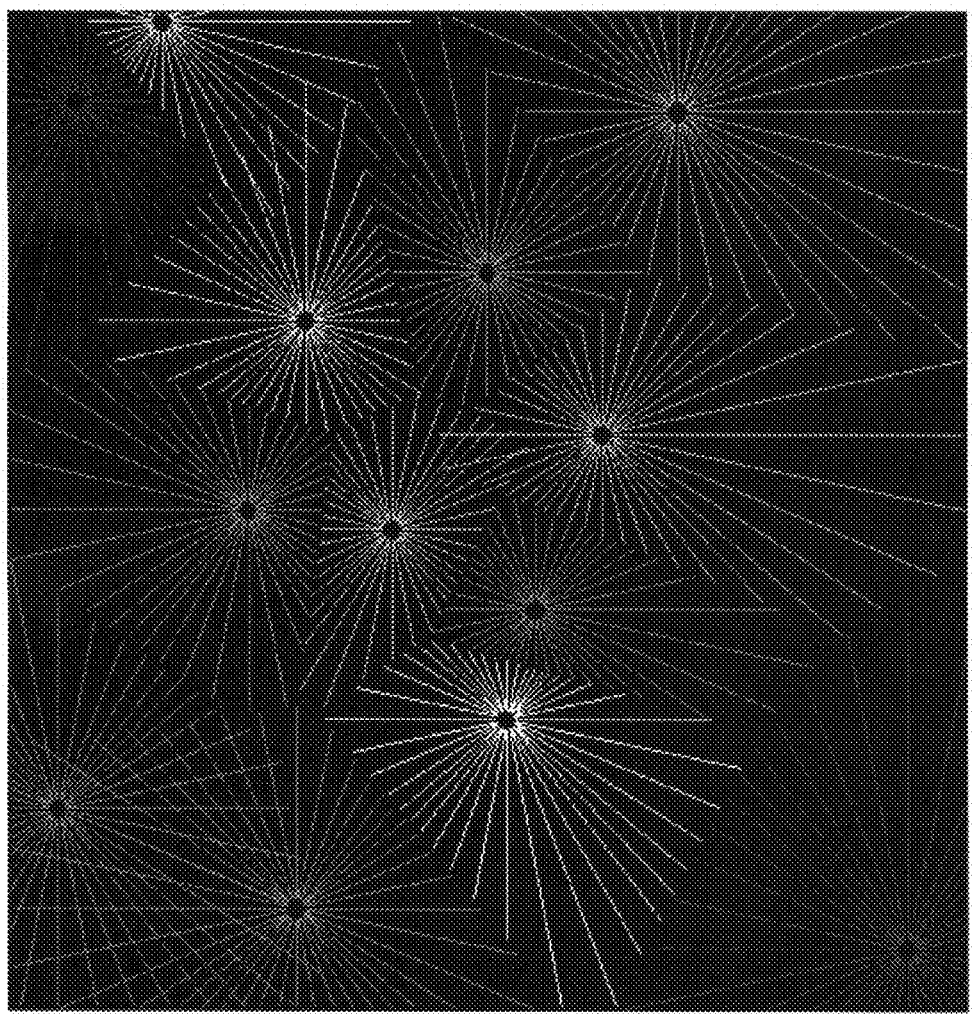

The method comprises taking each generator, and for each point p in this generator, selecting multiple directions. Then for each direction for each point a ray is drawn, as per FIG. 3. The method recursively tests the ray in the direction, until a certain interval on the ray is of length less than or equal to a given error parameter h. Then a point corresponding to the interval on the ray is selected as an end point, and is stored in a machine readable format. The point that is selected as an end point is generally the middle point of the interval, but in fact it may be the outer point of the interval, the inner point of the interval, or any other point on the interval, as desired.

The cells are then defined by the end points, to produce the decomposed version of region X which is the Voronoi diagram. Finally the decomposed region X is output in machine readable format.

The recursion comprises bisecting the ray into two intervals each time to provide a middle point y of the current interval. Then the distance inequality condition is tested at y, and according to the result, the method selects either the part of the ray prior to the point y or beyond the point y for further bisection and testing. Thus if y is satisfies d(y,A)<d(y,p), then the inner part of the interval is further tested; otherwise, the outer part of the ray is further tested.

Figure 4:
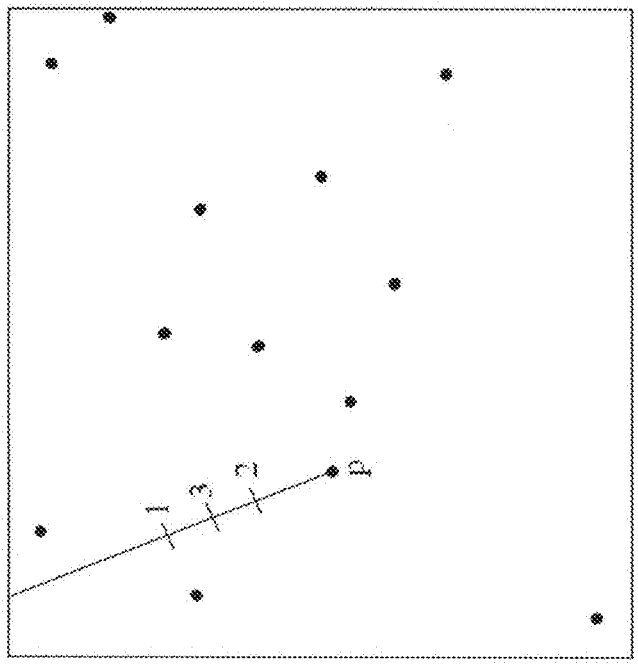

FIG. 4 illustrates a ray from p having an interval between points 1 and 2, which interval is bisected by the point 3.

Figure 5:
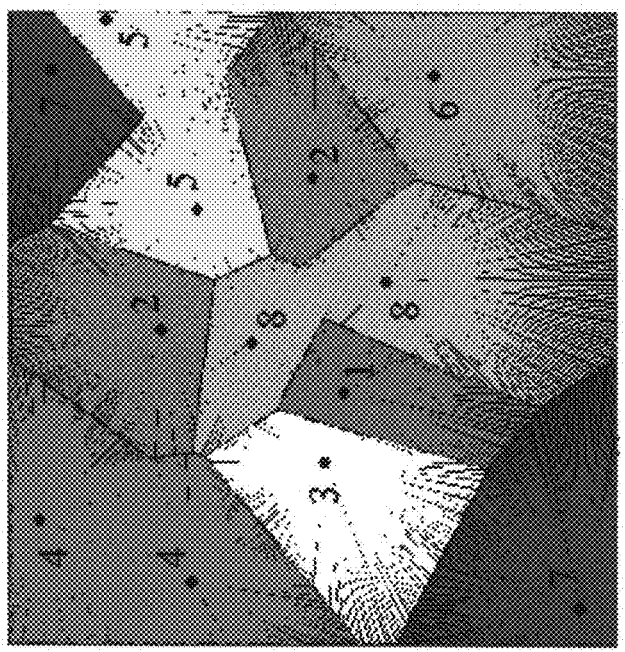

FIG. 5 shows the Voronoi diagram resulting from the generators shown in FIG. 4.

Figure 6:
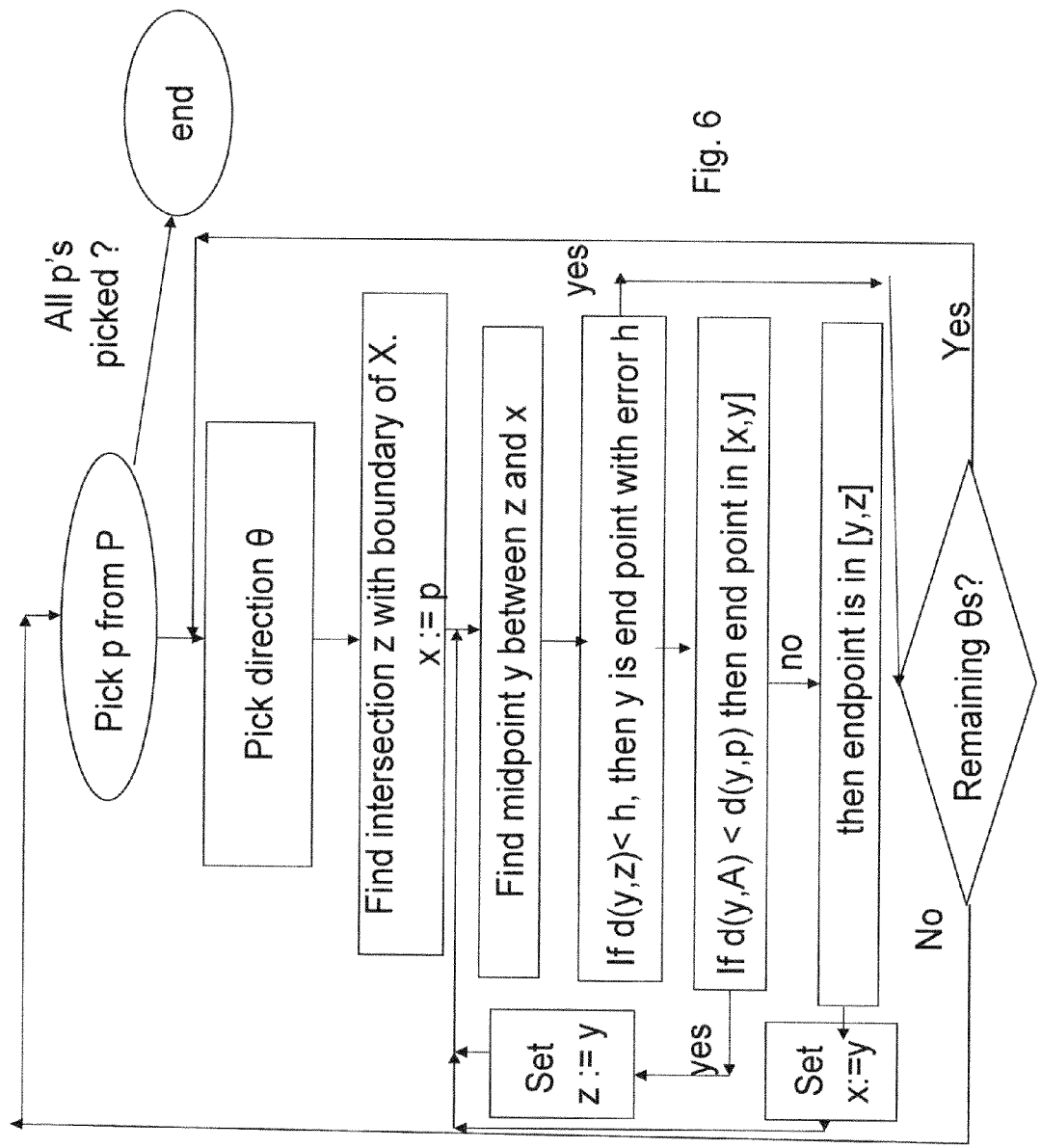

FIG. 6 describes in more details the main stages needed for constructing a certain cell using the method: denoting the corresponding generators by P, first a point p of P is chosen, Then a certain direction is chosen, and the intersection of the ray in this direction is found and denoted by z. One possible way to compute z is to use the bisection method again, by choosing a point w outside X on that ray, and then to take z to be the middle point between p and w. Another possible way is to use a simple formula. Let x be the point p, and y be the middle point between x and z. If the length of the interval [y,z] is less than some error parameter h, then y is taken to be the end point corresponding to this direction. Otherwise, further calculations are needed.

The inequality d(y,A)<d(y,p) is tested in some manner, and if the inequality holds, then z is redefined to be y, and y is redefined to be the middle point between x and z. Otherwise d(y,p) is not greater than d(y,A), and x is redefined to be y, and y is redefined to be the middle point between x and z. The same procedure is repeated until the length of the interval [y,z] is less than some error parameter h, and then y is taken to be the end point corresponding to this direction. The above procedure is repeated until all the directions and all the points in P were chosen.

Reference is now made to FIG. 7a where the stage of constructing rays in several directions is discussed in greater detail. The stage comprises constructing a list of directions. Each direction is in fact a unit vector on the unit sphere of the space. Here we will explain how to create the list of directions. Here we are in an m-dimensional normed space with norm |•|.

(1) Start with a parameter ω, 0<ω<2. This is the grid width.

(2) Create a grid on the boundary of the unit sphere induced by the max norm $|\cdot|_\infty$ with grid width ω. The unit sphere is simply the boundary of the m-dimensional cube $[-1, 1]^m$ in $\Re^m$.

(3) For any θ' in that grid, let θ=θ'/|θ'|. The list of directions is the set of all these θ. For instance, in FIGS. 3 and 5 the corresponding grid widths are 0.2 and 0.02, respectively, and hence there are 40 and 400 directions. FIG. 7A shows an initial grid.

An embodiment is now described with reference to FIGS. 7b and 8. They describe a relatively efficient way for testing the distance inequality condition. Here the generators are assumed to consist of finitely many points, and hence A consists of finitely many points. In addition, X is assumed to be an m-dimensional box in a normed space. Here d(y,p)=|y-p| is the distance between the point y and the point p. In addition, L' and U' are positive numbers such that L'≦U' and $L'|x|_\infty \leq |x| \leq U'|x|_\infty \forall x \in X$.

Here $x=(x_1, \ldots, x_m)$ and $|x|_\infty$ is the max norm: $|x|_\infty = \max\{|x_i|: i=1, \ldots, m\}$. From the equivalence of any two norms defined on the normed space such numbers exists. Now the efficient way for testing the distance inequality condition can be described.

First, the region X is divided into small parts (henceforth small boxes). For example, X can be divided into $b^m$ small boxes for some integer 0<b, where $b=[(Gn)^{1/m}]$ or $b=[((Gn)/\log(Gn))^{1/m}]$, where n is the number of generators and G is the number if points in each generator. Here [u] is the integer value of the number u. After dividing X into small boxes, the points of the generators are located in these small boxes. This stage is a pre-processing stage which is carried out before the actual chosing and testing the rays described earlier.

Now a certain box big B covering at least a substantial part of X is constructed around y. More precisely, B is the box centered at y with sides of length 2|y-p|/L'.

Then another box I, with sides of length 2|y-p|/U', is constructed within box B and covering the current point y and a region thereabout. If B or I are not fully contained in the region X, then only their intersection with X are considered.

Now, if some points of A are found within the small boxes in the interior of I, then d(y,A)<d(y,p), and this is the result of the distance function inequality. Otherwise, a search is carried out for points of A with successive layers of small boxes around I but inside B or which intersect B. The first layer consists of all the boxes which intersect the boundary of I, the second one consists of the boxes around it and so on. The last layer may contain boxes which intersect B but are not necessarily completely contained in it. The inequality d(y,a)<d(y,p) is tested for each point a in A which is found in these boxes. If d(y,a)<d(y,p) for some point a within some tested small box, then d(y,A)<d(y,p), and this is the result of the distance function inequality. Otherwise, the result of the distance function inequality is d(y,p)≦d(y,A).

FIG. 7B illustrates the above method in the Euclidean plane. Here P={p}. When comparing d(y, p) to d(y, a), only those a in A in the boxes in the gray area should be considered. In the figure itself no distance comparisons are needed because there are points of A in small boxes contained in the interior of I. Since the Euclidean plane is considered, L'=1 and U'=√2.

The box method of FIGS. 7b and 8 comprises locating each of the generators in the constructed boxes, and may forming a list (or an array) which maps to each box all the points of the generators which belong thereto. It is convenient to treat the list as an m-dimensional array, where each of its entries corresponds to a small box and it is a pointer to a (possible empty) list of the points in this small box. A corresponding list which maps to each point in each generator the box to which it belongs may also be formed as appropriate.

Reference is now made to FIGS. 9 and 10, which illustrate a method for reducing the number of calculations related to the rays. FIG. 9 illustrates the method in the case of dimension m=2, and FIG. 10 is a flow chart describing the method for general dimension m. The method is applicable to the case where the distance function is Euclidean, and the distance between P and A is positive. This method can be combined with the embodiments described earlier.

A point in some generator P is chosen, and $N=2^{(m-1)}$ end points corresponding to N directions (m is the dimension of the space), are computed. One constructs a certain (m−1)-dimensional box F corresponding to the N directions, and computes the end point in another, intermediate direction. Then one tests whether all the above N+1 end points lie on a same hyperplane, up to some error parameter. If all N+1 end points lie on the same hyperplane, up to some error parameter, then all the end points corresponding to directions between the N directions also lie on this hyperplane, so they can be computed directly. Otherwise, one divides F into two parts, and for each part recursively repeats the above procedure of denoting directions and end points, testing the hyperplane condition and so on, until end points are denoted for all directions.

Along the way several calculations can be saved, because they have been already done.

The method of FIGS. 9 and 10 may take advantage of saving and reusing end point calculations.

FIG. 10 is now described in greater detail. Here p+T(θ,p)θ is the end point corresponding to the point p, and located on the ray in the direction corresponding to the unit vector θ. In other words, T(θ,p) is the distance between the end point computed by the procedure described earlier, and the initial point p. The method for creating the list of directions described earlier in FIG. 7a should be recalled now.

One set F as an (m−1)-dimensional box in a unit sphere $S_\infty$ of $1_\infty$. The box has vertices $\theta'_1, \ldots, \theta'_N$, where $N=2^{(m-1)}$. The corresponding unit vectors from the list of directions are $\theta_i = \theta'_i/|\theta'_i|$. A middle point $\theta'_{N+1} = (\theta'_1 + \ldots + \theta'_N)/|\theta'_1 + \ldots + \theta'_N|_\infty$, which is a unit vector on F, is computed, The end points $p+T(\theta_i,p)\theta_i$, $i=1, \ldots, N$ are computed as described earlier. Now, if the length of one of the sides of F is less than ε, again an error factor, then we end for the current F. Otherwise, we compute the end point $p+T(\theta_{N+1},p)\theta_{N+1}$, i.e., the end point from p in the direction corresponding to $\theta_{N+1}$.

Now, if $p+T(\theta_i,p)\theta_i$, $i=1, \ldots, N$ and $p+T(\theta_{N+1},p)\theta_{N+1}$ are on the same hyperplane, up to another error parameter, then for all θ' in F we may now conclude that p+T(θ,p)θ is on the same hyperplane. The end points may thus be computed directly, and the current F is ended.

Otherwise, F is divided into two equal boxes and the preceding computations are repeated on each of the boxes. The method saves and reuses computations of $p+T(\theta_i,p)\theta_i$ wherever applicable.

FIG. 9 illustrates the method in R^2, i.e., m=2. The hyperplanes are lines. $p+T(\theta_1,p)\theta_1$, $p+T(\theta_2,p)\theta_2$ and $p+T(\theta_3,p)\theta_3$ are not on the same line, so a further subdivision should be made. $p+T(\theta_1,p)\theta_1$, $p+T(\theta_3,p)\theta_3$ and $p+T(\theta_4,p)\theta_4$ are on the same line.

There are several ingredients in the above method about which we want to give more details. First, in order to compute $p+T(\theta,p)\theta$ directly when it is known to be on some hyperplane, all we have to observe is that this hyperplane can be represented as $c=f(x):=n_1x_1+\ldots+n_mx_m$, where c is some constant, m is the dimension of the space, $n=(n_1,\ldots,n_m)$ is the vector determines the hyperplane, and $x=(x_1,\ldots,x_m)$ is a point on the hyperplane. Because we also know that $f(p+T(\theta_1,p)\theta_1)=c=f(p+T(\theta,p)\theta)$, we obtain from the linearity of f that $T(\theta,p)=T(\theta_1,p)f(\theta_1)/f(\theta)$, and $T(\theta,p)$ is found explicitly.

Second, in order to determine whether a set of at least m+1 points $u_1,\ldots,u_l$ are on the same (m−1)-dimensional hyperplane, we can simply use the formula for the distance between a point and a hyperplane. Alternatively, we can compute the (normal) vectors which determine the hyperplanes of $u_1,\ldots,u_m; u_2,\ldots,u_{m+1}$ and so on and compare them. Each such vector can be computed either by solving a linear system of equations, or directly by use of cross product. Any such vector is determined up to a sign.

Third, it is noted that because actually all our computations are approximated, for example because our points are not exactly on the same hyperplane, when comparing the above vectors we first normalize them, and then compare twice (because of the sign) the norm of their difference to some small fixed parameter which is our error estimate.

The above methods produce a machine readable output which is usable, for example, but not exclusively to uses thereof in controlling a communications network, managing a communication network, controlling a robot, managing a robot, modeling, testing or simulating a three-dimensional network, controlling a three-dimensional network, testing or modeling a material, controlling data searching, searching for data on a network, image processing, mesh generation and re-meshing, curve and surface generation/reconstruction, solid modeling, collision detection, controlling motion of vehicles, navigation, accident prevention, data clustering and data processing, proximity operations, nearest neighbor search, numerical simulations, weather prediction, analyzing and modeling proteins and other biological structures, designing drugs, finding shortest paths, pattern recognition, data compression, providing overall control of a plurality of methods for image processing, providing overall control of a plurality of methods for data categorization, providing overall control for a plurality of methods for data clustering, designing of electronic circuits, management of graphical information systems, locating a resource according to the solution of an efficient location problem, face recognition, and an artistic tool.

Applications of Voronoi Diagrams

In the following, applications of Voronoi diagrams are considered. Why do Voronoi diagrams have so many applications?

There are several properties of the structure referred to as the Voronoi diagram which make it useful. Some of these properties are:

1. A Voronoi diagram induces a partition of a given space into cells, and it is easier to understand or analyze the cells, perform operations on them, etc, rather than doing this on the whole space. Furthermore, in many cases this partition follows naturally from the given setting.

2. Sometimes useful information about the whole space or parts of it can be obtained by certain other parts of it, e.g., the Voronoi generators or the boundaries of the Voronoi cells.

3. By the very basic definition of the Voronoi diagram, its cells are defined by an optimal property. Specifically, the k-th cell is the set of all the points in the space whose distance to the k-th generator is not greater than their distance to the other generators. Many applications are designed for achieving an optimal solution to some problems.

4. A Voronoi diagram is a geometric structure which is related to other geometric structures (e.g., because it enables to compute them) which are useful by themselves, such as Delaunay tessellation or convex hull.

Below are several applications of Voronoi diagrams.

a. Mesh generation and re-meshing, rendering: the mesh is based on a triangulation, and the triangulation is created using Delaunay triangulation which is easily created by use of Voronoi diagrams.

b. Curve and surface generation/reconstruction, including solid modeling: again, based on triangulation (which approximates the surface) and this triangulation is based on Delaunay triangulation/tessellation.

c. Robot motion in an environment with obstacles, collision detection: the goal of the robot is to move in a safe way, i.e., to avoid colliding with the obstacles. One generates the Voronoi diagram of the obstacles (as generators), and the robot moves on the boundaries of the cells. The boundaries being those places in the space which are as far as possible from the obstacles. This is also good for part a of machine which is not necessarily a robot (say a mechanical arm) but moves in an environment with obstacles.

d. Motion of vehicles, accident prevention. The same principle applies as with the robot motion. The Voronoi diagram is computed and recomputed where the other vehicles are moving generators. The cells allow each vehicle to find a safest path. So the Voronoi generators are the vehicles and the other obstacles in the environment. The solution is good also for ships (and other naval vehicles), for planes (and other air vehicles), satellites and so on.

e. Clustering and data processing: the method is used for storing and manipulating the data in an efficient and convenient way. A data record may be provided as a point in a space, with several components (e.g., representing the longitude and latitude of a point, the age, salary and id number of a worker and so on), and one divides the space using the Voronoi cells of certain points. Now one can efficiently and conveniently carry out operations on the data (for example because it is in a more simple and concise form) such as compress it, search in it, further subdivide it and so on.

f. Proximity operations, nearest neighbor search, data search (including searching in data bases, search engines, searching in files and so on): as above: one partitions the space into the Voronoi cells of certain generators, and starting with an arbitrary initial point in the space, in order to find the generator which is the most closer or "resembles" this point, one only needs to find in which Voronoi cell this initial point is located.

g. Image processing: again, in order to analyze the image, a common way is via partitioning the image into small parts and working with these parts. The partition is done using a Voronoi diagram directly, or indirectly using Delaunay tessellation.

h. Simulations, analyzing, modeling and prediction of phenomena which are related to Geographic Information System (GIS): these are dynamic phenomena which consist of a large amount of data and are changed fast. Again, one partitions the space using the Voronoi cells of certain generators (depending on the phenomenon) or the Delaunay tessellations, and the diagram/tessellation is updated according to the changes related to the phenomenon. One obtains a convenient data structure which allows one to do efficient and convenient operations on it. In particular, this may help in weather prediction; navigation; prediction of spreading of diseases, contamination and fires; helping designing better vehicles by better understanding the water or air flows around them and the like.

i. Numerical simulations including finite element method: as before, but with many other phenomenon and not only with GIS.

j. Tool for solving facility location: for instance, where to optimally locate a new cellular antenna, a new restaurant or a new school. The Voronoi diagram is created using the antenna, restaurant etc as the generator.

k. Molecular biology: analyzing and modeling proteins and other biological structures. Here the Voronoi generators are certain molecules or atoms; also the Delaunay tessellation and other geometrical structures constructed from Voronoi diagrams (such as alpha and beta shapes) are used. Helps in understanding biological phenomena and designing drugs.

l. Material engineering: designing new materials or compounds. Analyzing and understanding existing materials is carried out by partitioning the material into the Voronoi cells, where the generators may be certain atoms, molecules, defects in the material and so on.

m. Designing and testing integrated circuit. Here one uses Voronoi diagrams for measuring and modeling what is called the critical area of an integrated circuit. The Voronoi diagram partitions the integrated circuit into Voronoi cells within which defects that occur cause electrical faults between the same two shape edges in the design. For computing the critical area for a particular fault mechanism, one constructs the Voronoi diagram for that particular fault mechanism.

n. Shortest paths: here one uses Voronoi diagrams for finding the shortest path between two points/shapes in a graph or an environment with obstacles. The shapes represent the generators and the boundaries of the Voronoi cells, which are used for computing the path. Examples: designing better integrated circuit by saving the amount of wires needed, designing a better path for a bus or a mechanical arm.

o. A tool for constructing other useful geometric structures, e.g., Delaunay tessellation/triangulation, convex hull, medial axis.

p. Pattern recognition: The partition of the image into Voronoi cells of certain generators helps in analyzing it and finding patterns or key features in it. Another possibility is to construct the medial axis or Delaunay tessellation associated with a certain Voronoi diagram, and use it for pattern recognition. Examples: character recognition (OCR), facial recognition.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents, and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A computerized method of decomposing a given region X into cells, the decomposition being induced by a set of generators $(P_k)_{k \in K}$, and a distance function by finding for each generator $P_k$ a cell, the cell comprising a set of all the points in X satisfying a distance inequality condition based on said distance function that the distance to a current generator $P=P_k$ is not greater than the distance thereof to the union A of the other generators, the method being carried out on an electronic processor and comprising:

for each generator, and for each point p in this generator, selecting a plurality of directions and for each direction recursively testing a ray in the direction, for intervals along the ray until a predetermined stopping condition is reached, wherein said recursively testing comprises bisecting the ray into two intervals to provide a middle point y, and then testing said distance inequality condition at y, and according to the result, selecting either the interval prior to the point y or beyond the point y for further bisection and testing, and wherein said stopping condition comprises a determination that the length of the corresponding interval is less than or equal to a further predetermined error parameter;

selecting a point corresponding to the interval as an end point, and storing the end point in a machine readable format;

defining at least one cell from said end points, thereby decomposing said region X;

outputting said decomposed region X comprising said at least one cell in machine readable format; and applying said decomposed region to one member of the group comprising: controlling a communications network, managing a communication network, controlling a robot, managing a robot, modeling, testing or simulating a three-dimensional network, controlling a three-dimensional network, testing or modeling a material, data searching, searching for data on a network or database, image processing, mesh generation and re-meshing, curve and surface generation, curve and surface reconstruction, solid modeling, collision detection, controling motion of vehicles, navigation, accident prevention, data clustering and data processing, proximity operations, nearest neighbor search, numerical simulations, weather prediction, analyzing or modeling proteins, analyzing or modeling biological structures, designing drugs, finding shortest paths, pattern recognition, rendering, data compression, providing overall control of a plurality of methods for image processing, providing overall control of a plurality of methods for data categorization, providing overall control for a plurality of methods for data clustering, designing and testing of electronic circuits, management of geographic information systems, locating a resource according to the solution of an efficient location problem, face recognition, and an artistic tool.

2. The method of claim 1, wherein the distance inequality condition is tested by:

computing d(y,A) and comparing it to d(y,p), or comparing d(y,p) to d(y,a) for all a in A until d(y,a)<d(y,p) is satisfied for the first time, or is not satisfied at all.

3. The method of claim 1, wherein testing the distance inequality condition comprises:
   a preprocessing stage in which the points of the generators are located in small boxes of X,
   selecting a ray and a point y thereon,
   constructing a box B around said point y,
   testing the inequality d(y,A)<d(y,p) by taking points a of A inside said small boxes in successive shells around y within or bisecting boundaries of B, and testing the inequality d(y,a)<d(y,p) for at least some of these points.

4. The method of claim 1, comprising, for at least one generator, denoting end points in $N=2^{(m-1)}$ directions, where m is the dimension of the space, denoting an (m−1)-dimensional box F corresponding to the N said directions, denoting an end point in another, intermediate direction, testing whether all N+1 denoted end points lie on a same hyperplane, up to a predetermined error parameter,
   if all N+1 end points lie on the same hyperplane, up to said predetermined error parameter, then regarding all end points corresponding to directions between said N directions as lying on said same hyperplane, otherwise dividing F into two parts, and for each part recursively repeating said denoting directions and end points, and testing the hyperplane condition until end points are denoted for all directions.

5. The method of claim 4, comprising saving and reusing end point calculations.

6. The method of claim 1 wherein said defining at least one cell from said end points comprises defining a plurality of cells.

7. The method of claim 1, further comprising using the decomposed region to construct a Delauney tessellation.

8. A computerized method of decomposing a given region X into cells, the decomposition being induced by a set of generators $(P_k)_{k-K}$, and a distance function by finding for each generator $P_k$ a cell, the cell comprising a set of all the points in X satisfying a distance inequality condition based on said distance function that the distance to a current generator $P=P_k$ is not greater than the distance thereof to the union A of the other generators, the method being carried out on an electronic processor and comprising:
   for a desired number being at least one, of said generators, and for a desired number being at least one, of points p in this generator, selecting a plurality of directions and for a desired number being at least one, recursively testing a ray in the direction, for intervals along the ray until a predetermined stopping condition is reached, wherein said recursively testing comprises bisecting the ray into two intervals to provide a middle point y, and then testing said distance inequality condition at y, and according to the result, selecting either the interval prior to the point y or beyond the point y for further bisection and wherein said stopping condition comprises determining that the length of the corresponding interval is less than or equal to a further predetermined error parameter;
   selecting a point corresponding to the interval as an end point, and storing the end point in a machine readable format;
   outputting said stored point in machine readable format; and
   applying said decomposed region to one member of the group comprising: controlling a communications network, managing a communication network, controlling a robot, managing a robot, modeling, testing or simulating a three-dimensional network, controlling a three-dimensional network, testing or modeling a material, data searching, searching for data on a network or database, image processing, mesh generation and re-meshing, curve and surface generation, curve and surface reconstruction, solid modeling, collision detection, controling motion of vehicles, navigation, accident prevention, data clustering and data processing, proximity operations, nearest neighbor search, numerical simulations, weather prediction, analyzing or modeling proteins, analyzing or modeling biological structures, designing drugs, finding shortest paths, pattern recognition, rendering, data compression, providing overall control of a plurality of methods for image processing, providing overall control of a plurality of methods for data categorization, providing overall control for a plurality of methods for data clustering, designing and testing of electronic circuits, management of geographic information systems, locating a resource according to the solution of an efficient location problem, face recognition, and an artistic tool.

9. The method of claim 8, comprising outputting a partial cell defined by at least two stored end points.

* * * * *